United States Patent [19]
Vives Clavel

[11] Patent Number: 6,084,945
[45] Date of Patent: Jul. 4, 2000

[54] PERFECTED PROTECTION AND CUTTING UNIT BY ROTATIONAL CONTROL DEVICE, FOR CONNECTION AND TESTING MODULES OF TELEPHONE LINES

[75] Inventor: Juan Vives Clavel, Albuixech, Spain

[73] Assignee: Mondragon Telecommunications, S.L., Velencia, Spain

[21] Appl. No.: 09/047,828

[22] Filed: Mar. 25, 1998

[30] Foreign Application Priority Data

Mar. 25, 1997 [ES] Spain .................................... 9700776

[51] Int. Cl.⁷ ...................................................... H04M 1/24
[52] U.S. Cl. ............................................................. 379/21
[58] Field of Search .............................. 379/21, 399, 412, 379/428, 430, 433

[56] References Cited

U.S. PATENT DOCUMENTS

| | | | |
|---|---|---|---|
| 4,600,810 | 7/1986 | Feldman et al. ................... | 379/399 |
| 5,175,662 | 12/1992 | DeBalko et al. .................. | 379/412 |
| 5,414,765 | 5/1995 | Lanquist et al. ................... | 379/399 |
| 5,687,213 | 11/1997 | Larkin ................................. | 379/21 |
| 5,872,831 | 2/1999 | Zoiss et al. ........................ | 379/21 |

FOREIGN PATENT DOCUMENTS 9400528  2/1994  Spain .

*Primary Examiner*—Curtis A. Kuntz
*Assistant Examiner*—Rexford M. Barnie
*Attorney, Agent, or Firm*—Ladas & Parry

[57] ABSTRACT

A device for connection to telephone system modules for testing of telephone lines associated with the modules. The device includes structure formed of multiple parts fitted together, wherein a top part provides a cover providing access to telephone terminals for testing characteristics of a telephone line. The top part has a central orifice for receiving a manually operated, rotationally disposed control device, the control device engaging tabs associated with metallic parts which are disposed in a reverse symmetrical arrangement in one of the multiple parts. The tabs impart straight line movement to the metallic parts in response to rotational operation of the control device to cause the parts to engage the telephone terminals.

9 Claims, 1 Drawing Sheet

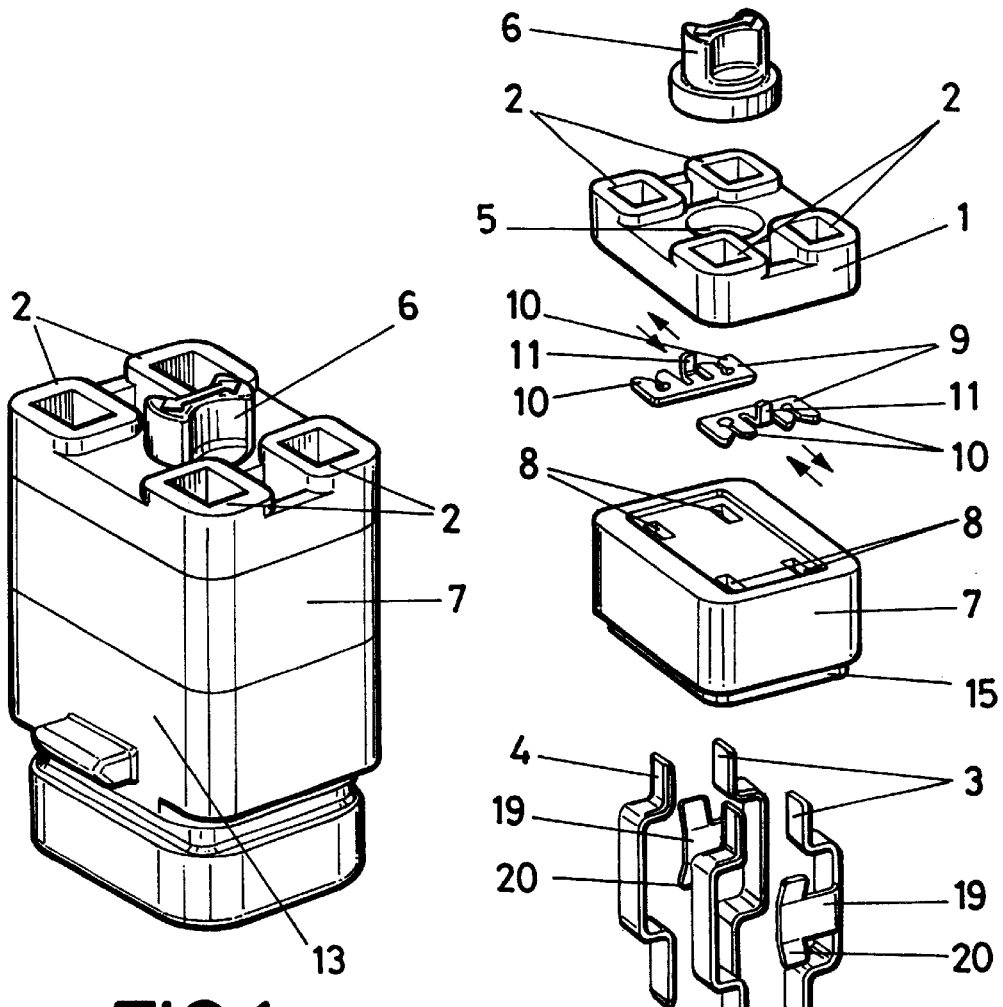
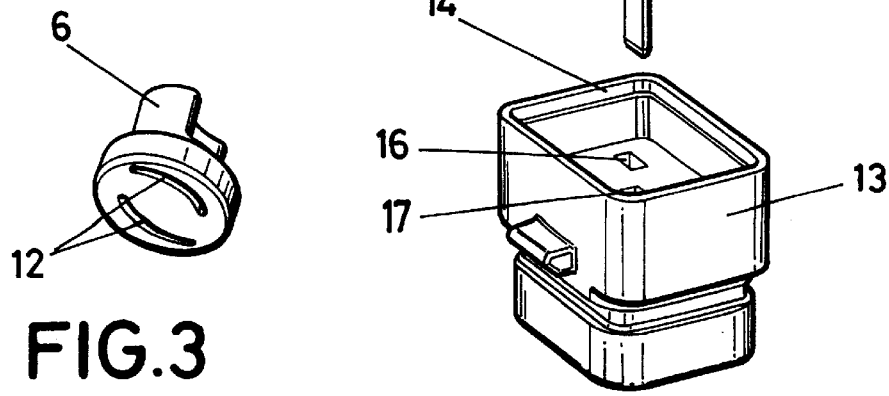
FIG. 1
FIG. 3
FIG. 2

PERFECTED PROTECTION AND CUTTING UNIT BY ROTATIONAL CONTROL DEVICE, FOR CONNECTION AND TESTING MODULES OF TELEPHONE LINES

DESCRIPTION

OBJECT OF THE INVENTION

The object referred to by the invention which is protected under this patent consists of a Perfected protection and cutting unit by rotational control device, for connection and testing modules associated with telephone lines.

It consequently deals with a component element of said modules, in which the following functions are attributed, a) The optional and temporary interruption of the network/subscriber electric continuity for conduction of the tests, without operating with the permanent connections of the module.

b) Accessibility to the appropriate contacts, in order to facilitate checking of the technical characteristics of the connection.

c) Protection against unpredictable irregularities of the constants of the current, especially overvoltages.

BACKGROUND OF THE INVENTION

The owner of the present patent, is also owner of Spanish Utility Model 9400528, granted and in force, the object of which is a "Perfected connection and testing module of telephone lines", in which a protection and cutting unit is integrated, the object of this invention offering certain advantagous differences over the same.

In effect, in the former, the cutting function was performed by means of the manual extraction of the protection unit, with which the continuity bridges in their interior were removed, interrupting the connection between the service (subscriber) and the couple (line) terminals, making one and the other accessible for performance of the testing.

During the development of these tests, the removed unit had to be held in the hand of the operator or provisionally put away, always introducing an obstruction in the task of the same, and additionally, since the work on a module is normally conducted in an inaccessible location without ladders, the dropping of the loose unit implied its loss or breakage, due to its reduced dimensions.

DESCRIPTION OF THE INVENTION

The purpose of the invention which constitutes the object of this patent is to solve the disadvantages which are proper to the known, previously described, protection and cutting unit, having been conceived and designed in compliance with this objective.

The structure of the present unit preferably comprises three independent rectangular prismatic parts, fitted to each other by superposition: the top part constituted by an independent unopenable cover, on the upper face of which various hollow turrets appear, at each one of its corners, on the inside of which the service and the couple terminals are accessible for the performance of the measurements of the technical characteristics of the current.

It is also preferably provided with a central orifice for the passage of the continuity or cutting rotational control device; whilst, on its lower face, it presents a peripherical flange of precision fit at the upper edge of the intermediate part.

This intermediate part, which is head of the unit, presents on the bottom of its hollow interior, four notches placed in respective proximity to the corners, for passage of the upper ends of the service and the couple terminals, in order that they be accessible from the hollow turrets and that the continuity and cutting bridge may be inserted in them, optionally joining in series, a terminal of each class.

The continuity and cutting bridges are preferably formed by two flat metallic parts, placed on one same plane, parallel to the bottom of the intermediate part and in reverse symmetrical arrangement, each has on its two ends clips, and on its central zone, an orthogonally raised tab on the plane of the bridge so that both tabs are each inserted into curved grooves performed on the base of the rotational control device, in such a manner, that, acting as cams when activating said control device, the rotational movement of the same is transformed into a straight movement on its actual plane and in opposite direction to the bridges until, if a continuity is intended to be established, the clips are inserted into the upper ends of the respective service and couple terminals, whilst if the cutting operation is intended, rotating the control device in opposite direction, the clips emerge through the ends of the terminals.

The lower part, which is the body of the unit, presents a peripherical recess on its upper edge, for the precision fit of the lower flange of the head of the unit, showing on the bottom of its hollow interior, four notches placed in respective proximity to the corners, for passage of the lower ends of the service and the couple terminals, plus a central notch for the passage of the grounding terminal, said interior capable of being filled with an insulating product for assuring the sealing of the union between the head (7) and the body (13) of the unit and to increase the dielectric stiffness between terminals.

The service terminals present sideways, on its central zone, various pins with respective transversal protection contacts, of confronted convex surfaces, which permit the parallel coupling among them of an ionizable noble gas discharger which, clamped by the grounding terminal, grounds the connection in case that overvoltages are produced in the network in excess of a preset limit value.

The lower ends of all the terminals (service, couple and grounding) penetrate through the bottom of the body so that, emerging through its lower face, they establish contact with the respective connection strips of the module, fitting into the same.

The exitance in the body of the unit of five contacts which are accessible prior to its sealed closure, cosntituted by the two service, the two couple and the grounding terminals, permit the attribution to the unit of diverse specific protection or checking functions, by means of the series or parallel coupling of known suitable means such as, for example, frequency filters, variable resistances (PTC), etc., independently from the previously described gas discharger.

BRIEF DESCRIPTION OF THE DRAWINGS

To complement the description of the invention and to facilitate the interpretation of its characteristics, of shape, structural and functional, drawings are enclosed, in which are schematically represented different aspects of a preferred embodiment of the perfected protection and cutting unit by rotational control device, for connection and testing modules of telephone lines, which constitutes the object of the present Utility Model.

In said drawings:

FIG. 1 shows a perspective view of the unit which constitutes the invention, totally assembled and coupled, ready for its insertion into the connection and testing module or block of telephone lines.

FIG. 2 is also a perspective view of the unit, though exploded to show its structure, separately presenting each one of its components, ordered according to the sequence of their assembly.

FIG. 3 represents a perspective of the rotational control device, viewed from below.

DESCRIPTION OF A PREFERRED EMBODIMENT

In order to show clearly the nature and the scope of the advantageous application of the present protection and cutting unit with rotational control device, for connection and testing modules associated with telephone lines which constitutes the object of the invention, herewith is described its structure and its operation, making reference to the drawings which, since they represent a preferred embodiment of said object with informative character, shall be considered in its widest and non-limiting sense of the application and the contents of the invention.

The structure of the present unit preferably comprises three independent rectangular prismatic parts, fitted to each other by superposition: the upper part (1) constitutes an independent unopenable cover, on the upper face of which, various hollow turrets (2) appear on each one of its corners, in the inside of which, the service (3) and the couple (4) terminals are accessible for the performance of measurements of the current characteristics.

It is also provided with a central orifice (5) for the passage of the continuity and cutting rotational control device (6); wilst on its lower face it presents a peripherical pin of precision fit on the upper edge of the intermediate part (7).

This intermediate part (7), which is the head of the unit, presents on the bottom of its hollow interior, four notches (8) placed in respective proximity to the corners, for passage of the upper ends of the service (3) and the couple (4) terminals, in order that they be accessible from the hollow turrets (2) and that the continuity and cutting bridges (9) be inserted into them, optionally joining in series, a terminal of each class.

Said continuity and cutting bridges (9) are formed by two flat metallic parts, placed on one same plane, parallel to the bottom of the intermediate part (7) and in reverse symmetrical arrangement, having each on their two ends, clips (10) and on their central zone, a tab (11) orthogonally raised from the major plane of the bridge so that both tabs are each inserted into curved grooves (12) formed at the base of the rotational control device (6), in such a manner that, acting as cams on activation of said control device, the rotational movement of the same is transformed into a straight movement in its major plane and in opposite direction to the bridges (9), until, if a continuity is intended to be established, the clips (10) are inserted into the upper ends of the respective service (3) and couple (4) terminals, whilst if a cutting function is intended, rotating the control device (6) an opposite direction, the clips (10) emerge from the terminal ends.

The lower part (13), which is the body of the unit, presents a peripherical recess (14) on its upper edge, for the precision fit of the lower pin (15) of the head (7) of the unit, showing at the bottom of its hollow interior, four notches (16) placed in respective proximity to the corners, for passage of the lower ends of the service (3) and coupling (4) terminals, plus a central notch (17) for passage of the grounding terminal (18), said interior capable of being filled with an insulating product to assure the sealing of the union between the head (7) and the body (13) of the unit and to increase the dielectric stiffness between terminals.

The service (3) terminals each present sideways, on their central zone, pins (19) with respective transversal protection contacts (20), with confronted convex surfaces, which permit the parallel coupling among them, of an ionizable noble gas discharger, which, clamped by the grounding terminal (18), grounds the connection in case that overvoltages are produced in the network in excess of a preset limit value.

The lower ends of all the terminals (service (3), couple (4) and grounding (18)), penetrate the bottom of the body (13) so that emerging through their lower face, they establish contact with the respective connection stirps of the module, fitting into the same.

The existance in the body (13) of five contacts, accessible prior to its sealed closure, constituted by the two service (3), the two couple (4) and the grounding (18) terminals, permit the attribution to the unit of diverse specific protection or checking functions, by means of the series or parallel coupling of known suitable means.

Now that the nature and the functional scope of the invention have been sufficiently described, as well as a preferred embodiment for their performance, it is to be understand that the same may be variable in the materials, shapes, dimensions used and, in general, all those accessory or secondary characteristics which do not alter, change or modify its essentiality, are included within the scope of the appended claims.

I claim:

1. A device for connection to and testing of telephone lines, said device comprising a structure formed of a top part, an intermediate part and a lower part, the top part, the intermediate part and the lower part all being fitted to each other by superposition, wherein the top part includes an unopenable cover having a plurality of corners with hollow turrets disposed at each corner, the turrets having interiors providing access to service and couple terminals for the performance of measurements of the current characteristics of a telephone line, the top part also having a central orifice for receiving a rotational control device used for continuity or other testing.

2. A device for connection to and testing of telephone lines according to claim 1 wherein the intermediate part has plurality of corners which align with the corners of the top part and which, presents on a bottom portion thereof a hollow interior with four notches placed in respective proximity to corners of the intermediate part, for passage of upper ends of the service and couple terminals, so that they are accessible via the hollow turrets and so that continuity and cutting bridges may be inserted into the same, optionally joining in series, a terminal of each class.

3. A device for connection to and testing of telephone lines according to claim 1 wherein the continuity and cutting bridges are formed by two flat metallic parts, placed on a common plane, parallel to a bottom of the intermediate part and in a reverse symmetrical arrangement, which have on each of their two ends clips and in a central zone an orthogonally disposed tab the tab of each metallic part being received in a curved groove arranged at the base of the rotational control device in such a manner that the groove acts as a cam when activated by rotation of said control device, the tabs transforming rotational movement of the control device into straight movement in an opposite direction to the bridges, until, if continuity is intended to be established, clips are inserted into upper ends of the respective service and couple terminals, whilst if a cutting function is intended, rotating the control device in an opposite direction, causes emergence of the clips of the terminal ends.

4. A device for connection to and testing of telephone lines according to claim 1 wherein the lower part, which provides a body for the device, has a peripheral recess on its upper edge for precision fit to the intermediate part, the lower part having a hollow interior with four notches, placed in respective proximity to corners of the intermediate part, for passage of the lower ends of the service and couple terminals, plus a central notch for passage of a grounding terminal.

5. A device for connection to and testing of telephone lines according to claim 1 wherein the service and couple terminals each present, on their central zone, pins with respective transverse protection contacts, with confronting convex surfaces, which permit parallel coupling among them of an ionizable noble gas discharger, which is clamped by the ground terminal, and which grounds the connection in an event that overvoltages are produced in a telephone network in excess of a preset limit value, the discharger penetrating the lower ends of all the service couple and grounding terminals, the bottom of the body so that emerging through its lower face, establish contact with the respective connection strips of a module associated with said telephone lines.

6. A device for connection to and testing of telephone lines according to claim 1 wherein in the body five contacts are provided which are accessible prior to closure of the device, the five contacts being constituted by two service terminals, two couple terminals and one grounding terminal, which permit the attribution to the unit of diverse specific protection or checking functions, by means of the series or parallel coupling of known suitable means.

7. A device for connection to and testing of telephone lines according to claim 4 wherein, said interior is filled with an insulating medium to assure sealing of a union between the intermediate and lower parts of the device.

8. A device for connection to and testing of telephone lines according to claim 4 wherein said interior is filled with an insulating medium for increasing dielectric isolation of the terminals.

9. A device for connection to telephone system modules for testing of telephone lines associated with the modules, said device comprising a structure formed of a multiple parts fitted together, wherein a top part provides a cover providing access to telephone terminals for testing characteristics of a telephone line, the top part also having a central orifice for receiving a manually operated, rotationally disposed control device, the control device engaging tabs associated with metallic parts which are disposed in a reverse symmetrical arrangement in one of the multiple parts, the tabs imparting straight line movement to the metallic parts in response to rotational operation of the control device to cause the parts to engage the telephone terminals.

* * * * *